Jan. 30, 1940.    J. L. ZALESKY    2,188,618
INSECT EXTERMINATOR
Filed March 24, 1939    2 Sheets-Sheet 1

Inventor
Joe L. Zalesky.

By Clarence A. O'Brien
and Hyman Berman
Attorneys

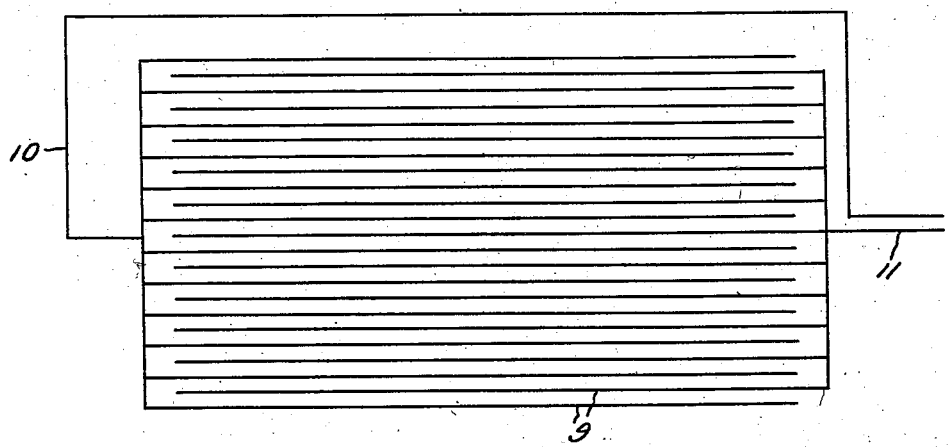
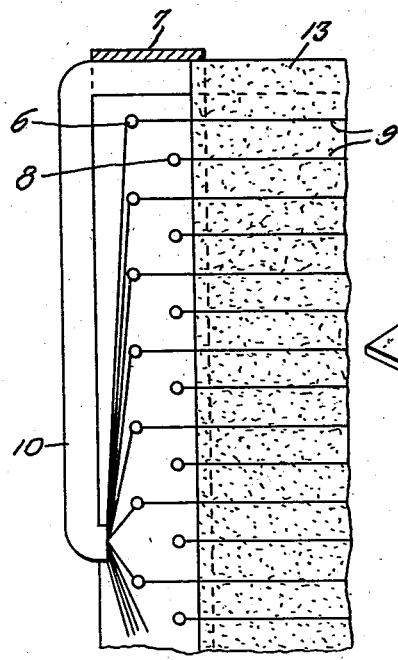
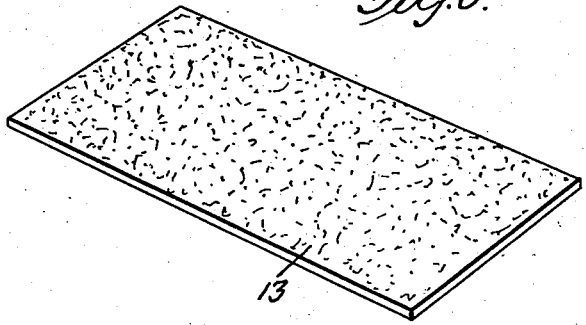

Patented Jan. 30, 1940

2,188,618

UNITED STATES PATENT OFFICE 2,188,618

INSECT EXTERMINATOR

Joe L. Zalesky, Buckholts, Tex.

Application March 24, 1939, Serial No. 264,021

1 Claim. (Cl. 43—112)

This invention appertains to new and useful improvements in means for killing insects such as flies by electricity.

The principal object of the present invention is to provide an electrocuting device for flies and other insects which can be baited and placed in any out-of-the-way place to the end that human attention will not be required and that it can be safely employed.

Another important object of the invention is to provide a device of the character stated which will be of simple construction and low cost of manufacture.

These and other objects and advantages of the invention will become apparent to the reader of the following specification.

In the drawings:

Figure 4 is a fragmentary detailed sectional view on the line 4—4 of Figure 2.

Figure 5 is a diagrammatic view.

Figure 6 is a perspective view of the bait sheet.

Figure 1:
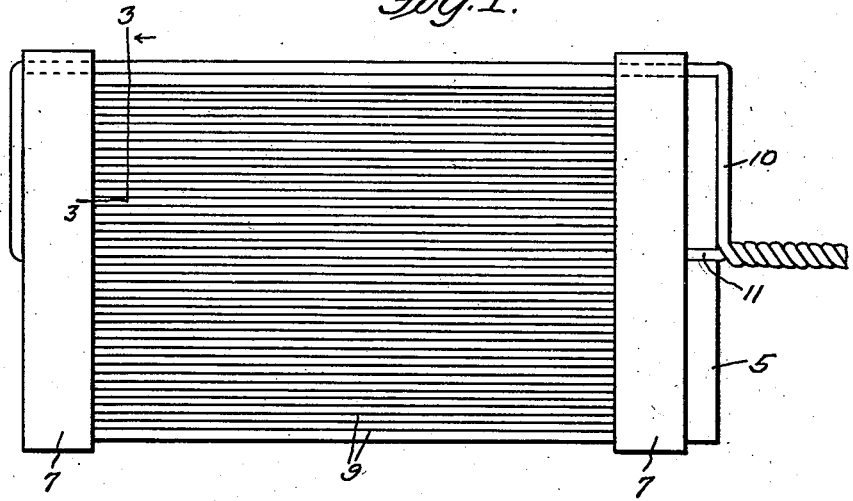
Figure 1 represents a top plan view.
Figure 2:
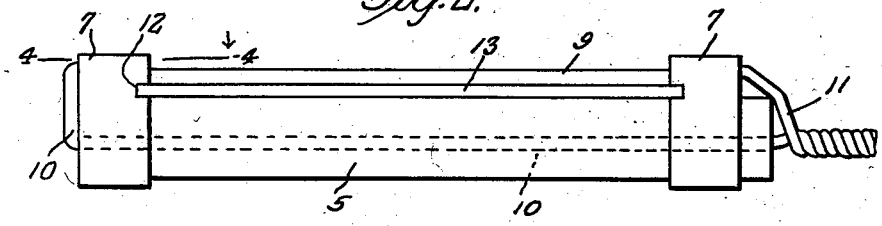
Figure 2 is a side elevation.
Figure 3:
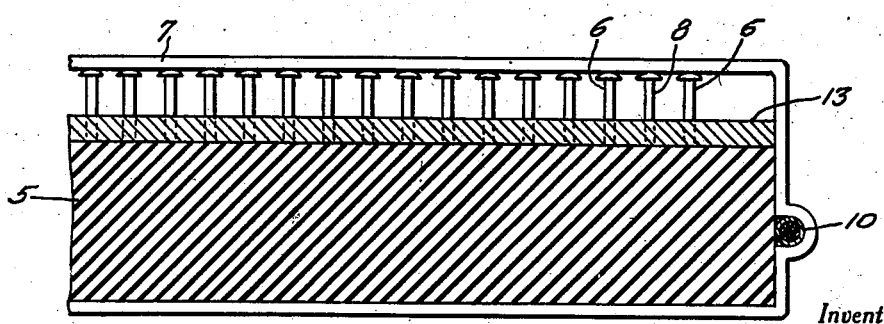
Figure 3 is a sectional view on the line 3—3 of Figure 1 with the conductor wires removed.

Referring to the drawings wherein like numerals designate like parts, it can be seen that numeral 5 represents a block of insulation (preferably wood). Into each end of the block is driven a row of nails or the like 6 and at each end of the block 5 is a rectangular-shaped band 7 which passes under the block and at the sides thereof and across the row of nails. This band may be in the form of an insulating tape.

At each end of the block is a second row of nails 8 which are also covered over by the corresponding band 7.

Wires 9 extend from each of the nails or pegs 6 at each end of the block and are suitably secured to corresponding nails or pegs 8 at the opposite end of the block 5.

At one end of the block, all of the wires connected to the nails or pegs 6 have extensions 9 and are connected to the positive wire 10, while at the opposite end of the block all of the wires connected to the nails or pegs 6 have extensions which connect commonly to the negative wire 11.

The band 7 can be slotted or notched as at 12 to accommodate the end portions of the bait plate or sheet 13 which can be slipped under the wires 9, so that insects, flies or the like will have to pass downwardly between the wires 9 and in doing so will bridge the wires and result in their electrocution.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:

An insect exterminating device comprising a block of insulation, a row of pins rising from each end of the block of insulation, a band circumscribing each end portion of the block of insulation and being disposed over the upper ends of the said pins, an end portion of each band being notched to provide a pair of opposed notches above the said block of insulation, and a bait supporting plate disposed on the said block with its end portions disposed into the notches of the said bands, current carrying wires extending between the said pins, said wires being located above the said bait-supporting plate.

JOE L. ZALESKY.